US 8,165,770 B2

(12) United States Patent
Getman et al.

(10) Patent No.: US 8,165,770 B2
(45) Date of Patent: Apr. 24, 2012

(54) TRAILER OSCILLATION DETECTION AND COMPENSATION METHOD FOR A VEHICLE AND TRAILER COMBINATION

(75) Inventors: Anya Lynn Getman, Henry, IL (US); Perry Robinson Macneille, Lathrup Village, MI (US); Aric David Shaffer, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 13/170,851

(22) Filed: Jun. 28, 2011

(65) Prior Publication Data
US 2011/0257860 A1 Oct. 20, 2011

Related U.S. Application Data

(62) Division of application No. 11/868,461, filed on Oct. 5, 2007, now Pat. No. 8,010,252.

(51) Int. Cl.
G06F 7/70 (2006.01)
(52) U.S. Cl. ........... 701/70; 701/37; 701/78; 701/83; 280/432; 280/445; 280/442; 340/431
(58) Field of Classification Search .......... 701/37, 701/70, 78, 83; 280/432, 445, 442; 340/431
See application file for complete search history.

(56) References Cited

U.S. PATENT DOCUMENTS

| | | | |
|---|---|---|---|
| 5,001,639 A | 3/1991 | Breen | |
| 5,022,714 A * | 6/1991 | Breen | 303/7 |
| 5,029,948 A * | 7/1991 | Breen et al. | 303/7 |
| 5,033,798 A * | 7/1991 | Breen | 303/7 |
| 5,152,544 A | 10/1992 | Dierker, Jr. et al. | |
| 5,410,109 A * | 4/1995 | Tarter et al. | 177/136 |
| 5,455,557 A | 10/1995 | Noll et al. | |
| 6,446,998 B1 | 9/2002 | Koenig et al. | |
| 6,450,019 B1 | 9/2002 | Wetzel et al. | |
| 6,480,104 B1 | 11/2002 | Wall et al. | |
| 6,516,925 B1 | 2/2003 | Napier et al. | |
| 6,655,710 B2 | 12/2003 | Lindell et al. | |
| 6,959,970 B2 | 11/2005 | Tseng | |
| 2002/0128751 A1 | 9/2002 | Engstrom et al. | |
| 2004/0064235 A1* | 4/2004 | Cole | 701/70 |
| 2004/0098185 A1* | 5/2004 | Wang | 701/70 |
| 2005/0128060 A1 | 6/2005 | Rennick et al. | |
| 2005/0206229 A1 | 9/2005 | Lu et al. | |
| 2006/0033308 A1 | 2/2006 | Waldbauer et al. | |
| 2007/0182528 A1 | 8/2007 | Breed et al. | |

FOREIGN PATENT DOCUMENTS

| | | |
|---|---|---|
| EP | 1234739 A | 8/2002 |
| WO | WO 0249900 A | 6/2002 |
| WO | WO 2006000578 A | 1/2006 |

* cited by examiner

Primary Examiner — Redhwan k Mawari
(74) Attorney, Agent, or Firm — Angela M. Brunetti; Fredrick Owens

(57) ABSTRACT

A system and method of controlling a vehicle with a trailer comprises determining the presence of a trailer, generating an oscillation signal indicative of trailer swaying relative to the vehicle, generating an initial weighted dynamic control signal for a vehicle dynamic control system in response to the oscillation signal, operating at least one vehicle dynamic system according to the dynamic control signal, and thereafter, iteratively generating a penalty function for the weighted dynamic control signal as a function of the oscillation signal response. A neural network with an associated trainer modifies the dynamic control signal as a function of trailer sway response.

12 Claims, 4 Drawing Sheets

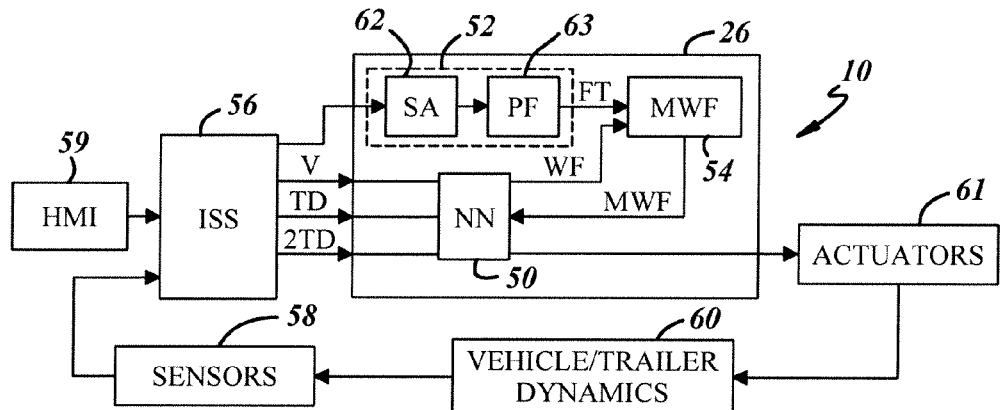
FIG. 2
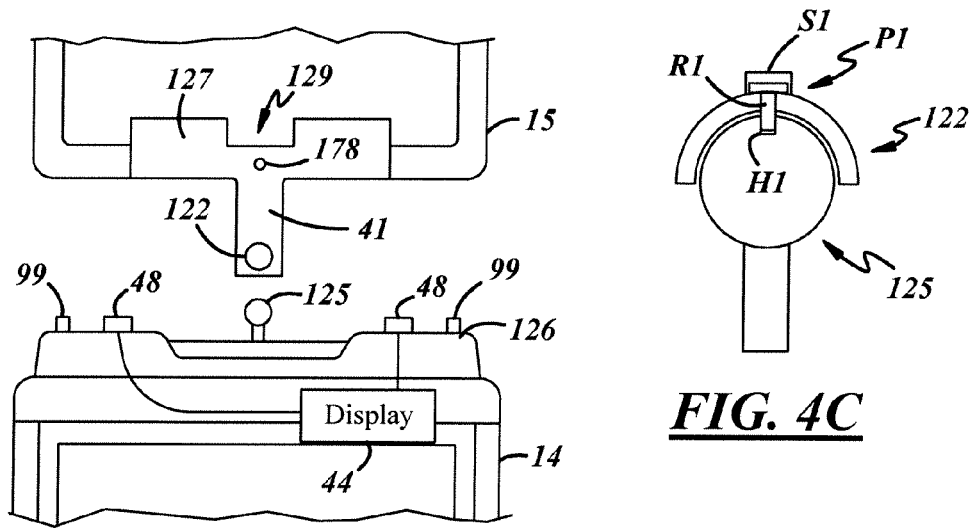
FIG. 4A
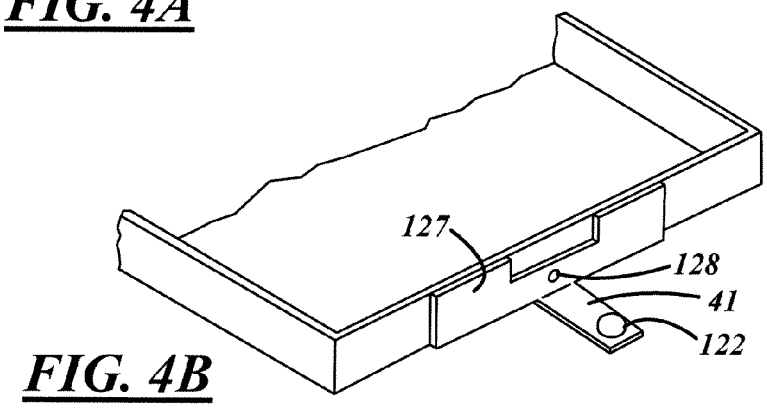
FIG. 4C
FIG. 4B

TRAILER OSCILLATION DETECTION AND COMPENSATION METHOD FOR A VEHICLE AND TRAILER COMBINATION

CROSS REFERENCE

This application is a divisional of U.S. application Ser. No. 11/868,461 filed on Oct. 5, 2007 now U.S. Pat. No. 8,070,252, herein incorporated by reference.

TECHNICAL FIELD

The present invention relates generally to a dynamic control system for an automotive vehicle and trailer, and more particularly, to a system for mitigating trailer oscillation relative to the vehicle by the use of a neural network control scheme.

BACKGROUND

Trailer oscillation can create vehicle stability problems. It occurs under specific conditions when a vehicle that is pulling a trailer, wherein the tow point of the trailer is rearward of all vehicle axles, for example when a light vehicle tows a trailer by way of a hitch or tow package. Trailer oscillation is a condition in which the pivot between the trailer and the towing vehicle swings in an oscillatory pattern side-to-side and/or up-and-down. The situation presents vehicle handling difficulties, particularly during heavy braking and traveling down hill. Trailer oscillation can lift the rear end of a vehicle and push the vehicle side-to-side, significantly increasing the risk of a rollover accident.

Some vehicles are equipped with inertial measurement units (IMU) including yaw sensors for stability control. These sensors can provide information regarding vehicle and trailer oscillation, but do not provide a complete solution. Preferably, such systems should include an IMU on the trailer as well, because a trailer can oscillate with the vehicle oscillating. Such solutions, however, would be expensive, and not all vehicles have IMU sensors.

Other oscillation detection schemes employ simple rules-based logic. Such systems lack robustness because of the numerous unknown vehicle and trailer dynamic possibilities. Using many different types of sensors to improve system robustness consequently makes integration of such inputs and computation of outputs very difficult. Thus, there exists a need for an improved control scheme to mitigate trailer oscillation, and which can readily adapt to numerous vehicle and trailer combinations. The system should also be able to accommodate vehicles and trailers without IMU sensor sets.

SUMMARY

The present invention provides a method and apparatus for detecting and mitigating trailer oscillation, thereby allowing the vehicle to maintain or increase speed without adverse handling consequences.

In one aspect of the invention, a control system for a vehicle pulling a trailer includes an oscillation detector generating an oscillation signal, a vehicle dynamic control system operating at least one vehicle dynamic system by way of a dynamic control signal, and a controller coupled to the oscillation detector and the dynamic control system, the controller comprising a neural network and an associated trainer. The neural network is programmed to output a weighted dynamic control signal to the vehicle dynamic control system in response to the oscillation signal and a weight function of the trainer. The tow point of the trailer is located rearward of all vehicle axles, and the dynamic control system includes at least one of a vehicle brake controller, wheel torque controller, engine torque controller, or suspension controller.

In one aspect, the trainer modifies the weight function communicated to the neural network in response to a penalty function. Further, the penalty function retains a weight function for a dynamic control signal which mitigates detected trailer oscillation, and reduces a weight function for a dynamic control signal which does not mitigate detected trailer oscillation. The trainer is a software module that trains the neural network to correct for trailer oscillation. The trainer teaches the neural network to constantly improve the correction and prevention of trailer oscillation.

In a further aspect of the invention, a method of controlling a vehicle that is pulling a trailer, wherein the tow point of the trailer is rearward of all vehicle axles, is provided. The method includes the steps of determining an angular position of the trailer relative to the vehicle using a trailer sensor during forward motion of the vehicle; generating an oscillation signal indicative of trailer swaying relative to the vehicle said oscillation signal being generated as a function of the angular position; generating an initial weighted dynamic control signal for a vehicle dynamic control system in response to the oscillation signal; operating at least one vehicle dynamic system according to the dynamic control signal; and thereafter, iteratively generating a penalty function for the weighted dynamic control signal as a function of the oscillation signal response. The oscillation signal may generated by filtering out relevant sensor information from sensors that exist on many vehicles.

In another aspect of the invention, the system uses the backup aid sensors to detect trailer oscillation.

One advantage of the invention is that sensors used for reverse aid may be used to detect trailer position.

Another advantage of the invention is that sensors exist on many vehicles that can be utilized to also assist relative to the present invention, thereby allowing the present system to be implemented relatively inexpensively.

The embodiments of the present invention provide several advantages. One advantage provided by an embodiment of the present invention is the incorporation of a trailer brake controller that operates trailer brakes upon detection of vehicle/trailer swaying. The trailer brakes may be applied alone or in addition to vehicle brakes. Trailer braking is superior to vehicle braking in that it creates tension (rather than compression) between a vehicle and trailer, which lowers critical speed, minimizes oscillations and allows a vehicle to maintain its intended course and stable operation.

The above-stated advantages allow for quicker and safer trailer oscillation damping.

The present invention itself, together with further objects and attendant advantages, will be best understood by reference to the following detailed description, taken in conjunction with the accompanying drawings.

BRIEF DESCRIPTION OF THE DRAWINGS

For a more complete understanding of this invention reference the embodiments illustrated in greater detail in the accompanying figures and described below by way of examples of the invention wherein:

FIG. 2 is a high-level block diagrammatic view of a control system according to the present invention;

FIG. 4A is a perspective view of a trailer locating plate coupled to a trailer tongue relative to the vehicle;

FIG. 4B is a perspective view of the toe locating plate of FIG. 5;

FIG. 4C is a top view of an apparatus for determining the position of the trailer.

DETAILED DESCRIPTION OF THE PREFERRED EMBODIMENT

Figure 1:
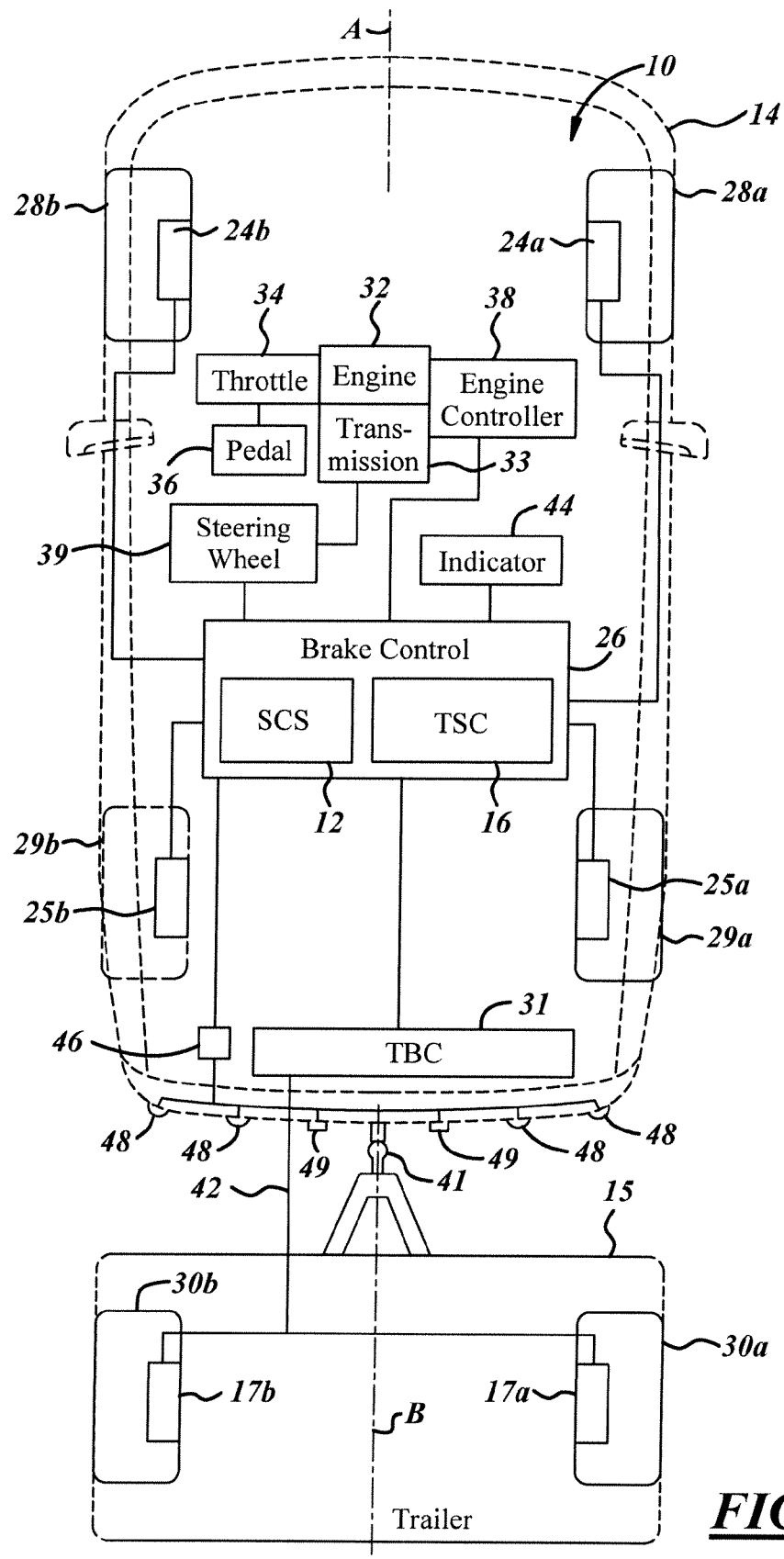
FIG. 1 is a block diagrammatic view of a control system applied to a vehicle and trailer combination, in accordance with an embodiment of the present invention.

In the following figures the same reference numerals will be used to identify the same components. The various terms and values are set forth by way of example and are not meant to be limiting.

The present invention may be used in conjunction with vehicle control systems including a yaw stability control (YSC) system, roll stability control (RSC) system, lateral stability control (LSC) system, integrated stability control (ISC) system, or a total vehicle control system for achieving desired vehicle performance. The present invention is also described with respect to an integrated sensing system (ISS), which uses a centralized motion sensor duster such as an inertial measurement unit (IMU) and other available, but decentralized, sensors. Although a centralized motion sensor, such as an IMU, is primarily described, the techniques described herein are easily transferable to using the other discrete sensors.

Referring now to FIG. 1, a block diagrammatic view of a control system 10 for a vehicle 14 in accordance with an embodiment of the present invention is shown. In this example, the vehicle 14 includes a vehicle stability control system 12. The control system 10, via the stability control system 12 and trailer sway control system 16, monitors and mitigates oscillations or swaying of the vehicle 14 and trailer 15 to provide operating stability. The stability control system 12 may be or include a RSC system, an ESC system, an YSC system, or some other stability control system known in the art. The stability control system 12 and trailer sway controller 16 may be part of a vehicle controller 26.

The IMU data associated with the stability control system 12 can indicate trailer sway or oscillation. However, trailer oscillation is not always transferred to the vehicle in a manner detectable by the vehicle IMU sensor set. Further, not all vehicles have an IMU. Nevertheless, the vehicle IMU will detect stability events with respect to the vehicle, which events may be caused by trailer oscillations. Of course, if the trailer is equipped with an IMU, oscillations can be readily detected by trailer IMU system either alone, or in combination with the vehicle IMU system.

A reverse aid system 46 having at least one reverse aid sensor 48 may be coupled to controller 26. Reverse aid sensor 48 may be but is not limited to an ultrasonic sensor, a radar sensor, or a combination of the two. The sensor may also be in the form of one or more cameras 49. Reverse aid sensors 48, 49 are typically located at several locations of the rear of the vehicle such as in the bumper. The reverse aid system 46 may be used to provide an indication as to the presence of a trailer and may also be used to generate a particular pattern with respect to the trailer to allow the controller 26 to have feedback with respect to the position of the trailer.

For example, the vehicle 14 has a longitudinal axis A, and the trailer 15 has a longitudinal axis B. As shown, the axes A, B are aligned. When turning, or when the trailer 15 sways, the trailer axis B will have an angle with respect to the vehicle axis A. This relative angle between the vehicle and trailer can be detected by reverse aid sensors 48 or backup cameras 49.

The controller 26 can also include a brake controller to actuate front vehicle brakes 24a and 24b and rear vehicle brakes 25a and 25b. The vehicle brakes 24 and 25 are associated with the wheels 28a, 28b, 29a and 29b. In the example of FIG. 1, the trailer 15 includes trailer brakes 17. The control system is in communication with and controls the operation of the trailer brakes 17a and 17b by way of a trailer brake controller 31. The trailer brakes 17 are associated with the wheels 30a and 30b. The brakes 17, 24, and 25 may be independently actuatable through the brake controller within the controller 26. Of course, electrically actuatable brakes may be used in the present invention and, as shown, are used on the trailer 15. The controller 26 is coupled to the trailer brake controller 31, which may be integrated as part of the controller 26. The trailer brake controller 31 is used in actuating the trailer brakes 17a and 17b.

The drivetrain circuit includes an internal combustion engine 32 or other engine known in the art such as diesel, hybrid, etc., with an associated transmission 33. Engine 32 may have a throttle device 34 coupled thereto, which is actuated by a foot pedal 36. The throttle device 36 may be part of a drive-by-wire system or by a direct mechanical linkage between the pedal 36 and the throttle device 34. The engine 32 may include an engine controller 38. The engine controller 38 may be an independent controller or part of the controller 26. The engine controller 38 may be used to reduce or increase the engine power. Electric motors are also contemplated by the present invention. In such cases, the drivetrain layout may omit the transmission 33, and have multiple electric motors; one at each of the wheels.

A steering wheel 39 provides directional input for the vehicle operator in a known manner.

The controller 26 may be microprocessor based such as a computer having a central processing unit, memory (RAM and/or ROM), and associated input and output buses. The controllers may be application-specific integrated circuits or may be formed of other logic devices known in the art. The controllers 12, 16, 31, 38 may each be a portion of a central vehicle main control unit, an interactive vehicle dynamics module, a restraints control module, a main safety controller, a control circuit having a power supply, combined into a single integrated controller, or may be stand-alone controllers as shown.

The trailer 15 is towed behind vehicle 14. The trailer 15 may include a hitch 41 that is hitched to the vehicle 14. Although the trailer is shown as having a pair of wheels 30 and a pair of brakes 17, it may have any number of axles/wheels and brakes. A harness 42 may be used to couple the electrical components such as the brakes 17 and the trailer lights to the electrical system of the vehicle 14. Of course, the communication between the trailer and the vehicle may be wireless in which case both the vehicle and trailer would have transceivers (not shown) for such communication. The vehicle brakes and the trailer brakes may each be operated and controlled separately, independently, in unison, simultaneously, dependently, or in some other format depending upon the situation.

The harness 42 couples the trailer 15 to the trailer brake controller 31. The trailer brake controller 31 is capable of controlling the trailer brakes 17 together or independently and in collaboration with the vehicle brakes 24 and 25.

The control system also includes an indicator 44, which may be used to indicate to a vehicle operator various vehicle and trailer status information. The indicator 44 may include cluster message center or telltale display, or other indicator known in the art. In one embodiment of the present invention, the indicator 44 is in the form of a heads-up display and the indication signal is a virtual image projected to appear forward of the vehicle 14.

Referring now to FIG. 2, a high-level block diagrammatic view of a control system 10 according to the present invention is shown. The main controller 26 is shown to include a neural network 50 cooperating with a trailer oscillation detector 52 and a training module 54. The oscillation detector 52 may be part of the trailer sway control 16 of FIG. 1.

The controller 26 receives inputs from the integrated sensing system (ISS) 56. The ISS 56 may be in the form of a signal multiplexer that receives signals from various sensors 58 and inputs from the vehicle operator via the human-machine interface (HMI) 59. The HMI may be in the form of a keyboard or other known input device.

The ISS 56 provides the signals to the neural net 50 and oscillation detector 52. The ISS can also provide signals to other vehicle systems such as a roll stability control system. For example, the sensors may be used by the controller 26 in various determinations, such as to determine a wheel lifting event like an imminent rollover, determine various forces including normal forces at the wheels, determine a height and position of a mass, determine the instability trend of the vehicle dynamics as in unstable roll or yaw motions, determine the intentions of a driver, determine the feedforward control commands to drive actuators 61, determine feedback control commands for the desired functions, and the like. The sensors 58 monitor the vehicle and trailer dynamics 60. The vehicle and trailer dynamics are influenced by various actuators 61, which are controlled by the controller 26. The actuators may include safety systems, suspension control, an engine/transmission controller, the brake controller, and the like. The actuators permit the system to modify vehicle dynamics by such things as independently adjusting the wheel torque at each wheel, activating suspension components, modifying the steering angle, and/or braking any of the wheels.

The controller 26 as well as the suspension control, the brake controller, and the engine/transmission controller, and any other system controllers may be microprocessor based such as a computer having a central processing unit, memory (RAM and/or ROM), and associated input and output buses. The controllers may be application-specific integrated circuits or may be formed of other logic devices known in the art. The controllers may each be a portion of a central vehicle main control unit, an interactive vehicle dynamics module, a restraints control module, a main safety controller, a control circuit having a power supply, combined into a single integrated controller, or may be a stand-alone controller.

The neural net 50 receives data from the ISS 26 including data values from the various sensors and first and second time derivatives of data values. First and second time derivatives of data values introduce a time element into the neural network's learning that is typically hard to measure, such as acceleration. The received information is in the form of a data vector. The neural network 50 is an important part of the controller 26 because it has advantages in the application of a vehicle and trailer combination. In general, a neural network is beneficial when the exact nature of the relationship between inputs and outputs is unknown. If the relationship was known, it could be modeled directly. In the vehicle-trailer situation, the vehicle must be able to accommodate widely variable trailer configurations. Thus, the neural network 50 is advantageous because it learns the input/output relationship through the trainer 54. There are three major learning schemes associated with neural networks, each corresponding to a particular abstract learning task. These are supervised learning, unsupervised learning, and reinforcement learning. Supervised learning aims to find functions, in an allowed class of functions that match given examples. Tasks that fall within the paradigm of supervised learning are pattern recognition (classification) and regression (function approximation). In unsupervised learning the network is given some data, and the cost function to be minimized can be any function of the data and the network's output. In general, unsupervised learning is good for estimation models. In reinforcement learning, data is usually not given, but generated by an agent's interactions with the environment. Periodically, the agent performs an action and the environment generates an observation and an instantaneous cost, according to some (usually unknown) dynamics. The network tries to discover a policy for selecting actions that minimizes some measure of a long-term cost, i.e. the expected cumulative cost. Reinforcement learning is typically associated with control problems, games and other sequential decision making tasks.

The neural network 50 is structured to have an input layer, a hidden layer, and an output layer. The input layer has units which simply serve to introduce the values of the input variables. The hidden and output layer neurons are each connected to all of the units in the preceding layer. It is possible to define networks that are partially-connected to only some units in the preceding layer; however, for most applications fully-connected networks are more robust. When the network is executed (used), the input variable values are placed in the input units, and then the hidden and output layer units are progressively executed. Each of them calculates its activation value by taking the weighted sum of the outputs of the units in the preceding layer, and subtracting the threshold. The activation value is passed through the activation function to produce the output of the neuron. When the entire network has been executed, the outputs of the output layer act as the output of the entire network. In this example, the output is a data vector for controlling various vehicle systems 61 to mitigate the effect of any detected trailer oscillation.

The oscillation detector 52 determines whether the trailer is experiencing oscillation. This can be achieved in any known manner. As mentioned above, the vehicle IMU can be used to detect trailer oscillation, however, this may be less robust than if the trailer was equipped with an IMU and provided direct feedback of trailer movement. In such a case, at least the vehicle and/or trailer yaw rate could be analyzed to detect trailer oscillation. At least two other methods of detecting oscillation are contemplated by the present invention: backup camera imaging analysis, and ultrasonic sensor analysis. One example of optical image analysis for trailer applications is disclosed in U.S. application Ser. No. 10/905,715 which is incorporated by reference herein.

In the example of FIG. 2, the oscillation detector 52 receives ultrasonic data from the vehicle backup sensors 48 or reverse aid system 46 by way of the ISS 26. Two or more sensors on each side of the vehicle detect the relative angular relationship between the trailer axis B and the vehicle axis A. A filtering algorithm can detect distances which are consistent with major trailer features. These distances are then monitored and/or compared to radar or video images to compute trailer angle and determine oscillation.

In one embodiment, vertical and horizontal lines are determined by using a 3×3 Sobel mask which is placed over the image until a new image is created. The Sobel edge detection method is robust and uses a pair of 3×3 convolution masks; one estimating the gradient in the x direction or vertical (columns) and the other estimating the gradient in the y direction or horizontal (rows). A convolution mask is advantageous because it is typically much smaller than the actual image. The 3×3 mask acts as a derivative operator, and when its output is greater than a defined threshold, a single output pixel is placed into the new output image to identify the detected vertical or horizontal edge. For example, the threshold could be a comparison of pixels using grey scale values.

The edge detection process then measures the horizontal and vertical pixel location by tracking the edge lines in certain regions of the new edge map image, and measures the frequency/amplitude by using stored data and comparing several frames to each other. For instance, the corners of the trailer where the horizontal lower edge of the trailer meets with the vertical side edges of the trailer make for easy identification and measurement. For improved robustness, special markings can be placed on the trailer such as an "X", or multiple such markings, for the system to readily identify and track.

A digital filter can improve the oscillation detection scheme employing ultrasonic sensors because such sensors are sensitive to noise at higher vehicle speeds. When a tow vehicle is accelerating, the likelihood of trailer oscillation is greatly reduced. Therefore, during acceleration, a background reference noise signature can be determined (in the time and frequency domains). This can then be masked from the measured signals during other times to reduce noise. If particular distance measurements are known to be affected, trend algorithms can assume values for affected locations while attempting trailer oscillation tracking. Thus, trailer oscillation detection is based on the time measurement of distances collected from each ultrasonic sensor. The detection scheme looks for a correlation between sensors, rather than an anomaly, as two sensors in agreement regarding a relative trailer angle are more likely to be correct. A simple tracking method can then be employed to estimate the trailer motion when no two sensors agree, and a damping effort can be activated.

Thus, the oscillation detector 52 performs a spectral analysis by way of the spectral analyzer 62 of the sensor data to track the relative trailer angle. One example of the method begins by filling the spectral analyzer 62 data buffer with a desired number of samples, and scaling the reference range from, for example, zero to one. The absolute value of a fast Fourier transform (FFT) is then run to reveal the power spectrum of the sensor data. This results in a "golden" reference signal. The frequency signature of the current data is then correlated with the golden reference signature to identify extrema in the correlation signature. Extrema may be represented by peaks and/or valleys in the signal. The distances from the center of the signal to the extrema are measured to find the closest correlating matches. These matches are then ordered from least to greatest, and the best two or three can be selected. The information can then be clustered, for example, as axes on a 3D lookup which is formed from the previous data. The signal can then be categorized, based on its resulting surface; and the control scheme is implemented based on the state or condition indicated. It should be noted that a fast Fourier transform is one of many possible filter schemes that may be employed by the oscillation detector. The oscillation detector's objective is to detect if the vehicle is approaching a cyclic movement, on the order of 0.1 to 1 Hz to determine if oscillation is occurring.

The oscillation detector 52 also includes a penalty function 63. The penalty function 63 operates to inform the training block 54. The neural net 50 provides a weight factors to the training block 54 which, in turn, provides modified weight factors to the neural net 50.

In operation, the control system receives an initial set of data parameters for the vehicle and trailer. These can be assumed default parameters for the trailer based upon the type of vehicle. Alternatively, the initial trailer data can be entered by the operator through the HMI 59. Data such as the trailer type, number of axles, gross weight, etc. can be entered via the HMI 59. Additionally, a trailer identifier can be entered which allows particular information to be stored in a data base for recall later. When the trailer is attached to the vehicle, the system becomes active, and begins to monitor the sensors 58. When trailer oscillation is detected by the oscillation detector 52, the system implements the least invasive corrective action to mitigate the oscillation. For example, the vehicle speed may be slightly reduced, or the trailer brakes may be activated by way of the actuators 61. During oscillation mitigation, or after, the control system modifies the control parameters by the trainer 54, and evaluates the effect of each modification on the penalty function produced by the oscillation detector 52. When a corrective action reduces the penalty function, it is retained, and when it increases the penalty function, the parameter is reduced or returned to its original state. In this way, the trainer 54 optimizes the control strategy automatically for the particular vehicle and trailer combination through successive incremental changes over time. Thus, as the trainer 54 learns more data and the effects of mitigation efforts on the trailer dynamics, the control strategy becomes more robust. As a result of learning the most effective oscillation countermeasures, the vehicle may travel at an increased speed as compared to rule-based trailer oscillation mitigation systems. Advantageously, given default or assumed trailer characteristics, the system can quickly learn the best way to mitigate trailer sway. This process can be further improved by the operator inputting some trailer data via the HMI 59. By referencing the trailer identifier, the neural network can recall characteristics thereby avoiding having re-learn the best way to mitigate trailer sway when a particular trailer is used again.

Figure 3:
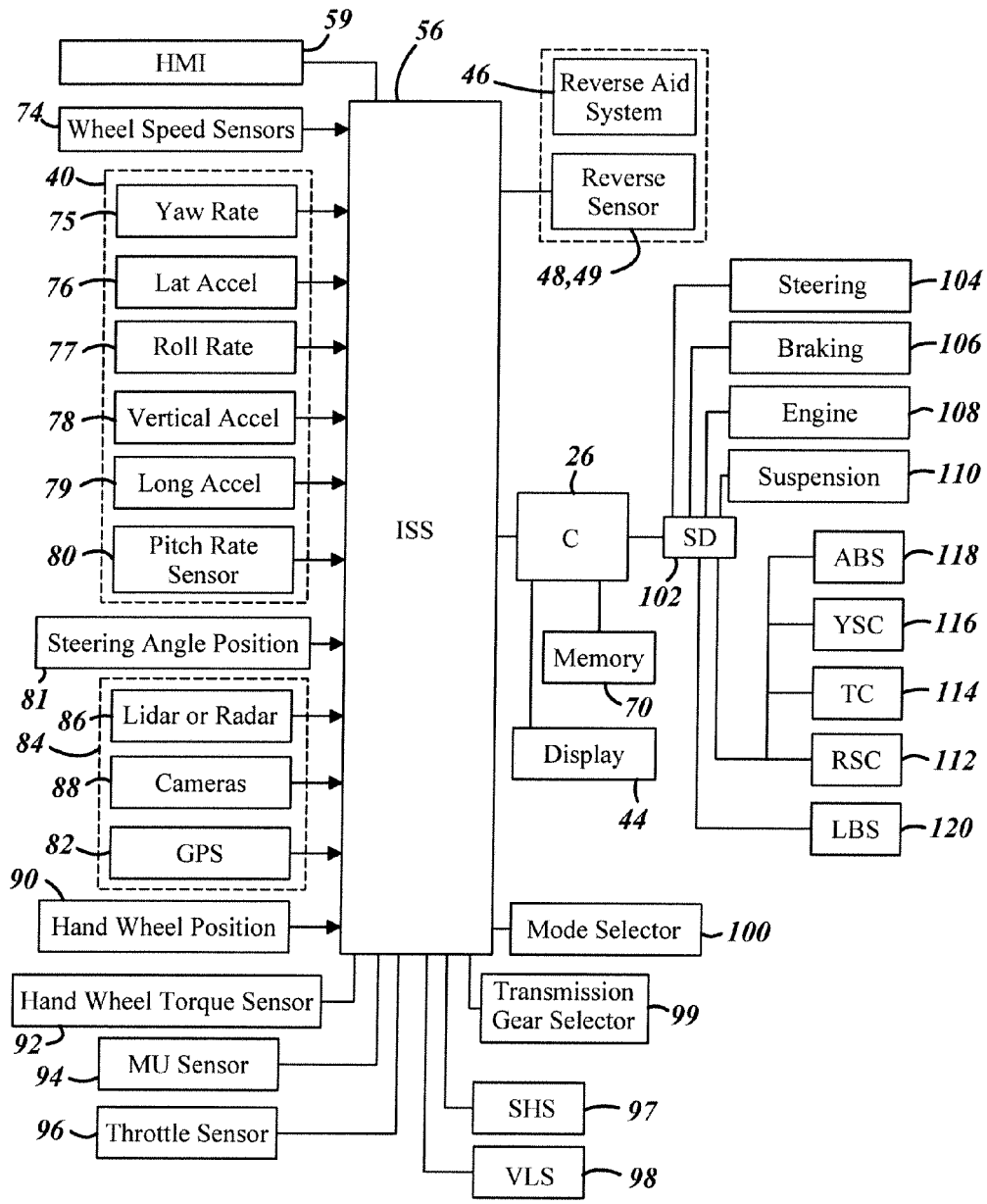
FIG. 3 is a more detailed block diagrammatic view of a control system according to the present invention.

FIG. 3 is a more detailed block diagrammatic view of a control system according to the present invention. The controller 26 is shown in communication with the ISS 56. Again, the controller 26 in this case may be a single centralized vehicle controller or a combination of controllers. If many controllers are used they may be coupled together to communicate various information therebetween, and arbitration and prioritization among multiple controllers might also be performed. Preferably, the controller 26 is microprocessor-based.

The controller 26 may be programmed to perform various functions and control various outputs. Controller 26 may also have a memory 70 associated therewith. Memory 70 may be a stand-alone memory or may be incorporated within the controller 26. Memory 70 may store various parameters, thresholds, patterns, tables or weight factors for the neural network. For example, a weighting of how much wheel torque (brake) to generate in response to trailer oscillation and vehicle velocity may be stored in memory 70 and modified by the trainer 54.

Several sensors and systems are shown in communication with the ISS 56. These sensors and systems are intended to be examples of data sources contemplated for use by the neural net 50 and controller 26. They are not meant to be limiting. In addition to the HMI 59, reverse aid system 46 and associated reverse sensors 48, 49 described above, the ISS 56 communicates with the vehicle IMU 70.

The IMU 70 may include speed sensors 74, a yaw rate sensor 75, a lateral acceleration sensor 76, a roll rate sensor 77, a vertical acceleration sensor 78, a longitudinal acceleration sensor 79, a pitch rate sensor 80, and steering angle position sensor 81. The IMU 70 shown is located on the vehicle. A similar IMU may also be located on the trailer, in which instance, trailer oscillation detection would be very robust. Of course, most trailers are not so equipped, and communication protocols are not standardized for data transmission between a trailer with an IMU and a vehicle.

In one embodiment, the sensors 75-81 are located at the center of gravity of the vehicle. Those skilled in the art will recognize that the sensors may also be located on various locations off the center of gravity and mathematically translated equivalently thereto.

Roll rate sensor 77 and pitch rate sensor 80 may be used to sense the vehicle roll and pitch conditions. The roll and pitch conditions of the vehicle might be conducted based on sensing the height of one or more points on the vehicle relative to the road surface. Sensors that may be used to achieve this include a radar-based proximity sensor, a laser-based proximity sensor and a sonar-based proximity sensor.

Roll and pitch conditions of the vehicle may also be sensed based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll and pitch conditions may also be sensed by sensing the force or torque associated with the loading condition of one or more suspension or chassis components including a pressure transducer in an active air suspension, a shock absorber sensor such as a load cell, a strain gauge, the steering system absolute or relative motor load, the steering system assist pressure, a tire laterally force sensor or sensors, a longitudinal tire force sensor, a vertical tire force sensor or a tire sidewall torsion sensor.

The roll and pitch condition of the vehicle may also be established by one or more of the following translational or rotational positions, velocities or accelerations of the vehicle including a roll gyro, the roll rate sensor 77, the yaw rate sensor 75, the lateral acceleration sensor 76, a vertical acceleration sensor 78, a vehicle longitudinal acceleration sensor 79, lateral or vertical speed sensors including a wheel-based speed sensor, a radar-based speed sensor, a sonar-based speed sensor, a laser-based speed sensor or an optical-based speed sensor.

Lateral acceleration, roll and pitch orientations and velocities may be obtained using a global positioning system (GPS) 82.

The ISS 56 may also be coupled to an object detection system 84. The system 84 may include a lidar, radar, or sonar 86. The lidar, radar, or sonar 86 may be used to generate a velocity signal or relative velocity signal of an object. The radar or lidar may also be used to generate a trajectory signal of an object. Likewise, the velocity of the vehicle in various directions may be obtained relative to a stationary object. A lidar, radar, or sonar sensor 86 may be mounted in various positions around the vehicle including the front, sides and/or rear. Multiple sensors may also be employed in multiple locations to provide multiple information from multiple positions of the vehicle. Such signals may be available from sensors on vehicles used during a self parking condition, allowing the present invention to utilize equipment that is already on the vehicle.

Object detection may also employ a camera system 88 having one or more cameras. A stereo pair of cameras may be mounted on the front of the vehicle to detect target objects in front of the vehicle, to measure the object size, range and relative velocity and to classify those objects into appropriate categories. Also, a stereo pair of cameras may be replaced by a single camera depending on the roll and pitch conditions measured by the system. Various types of cameras would be evident to those skilled in the art. Various types of cameras such as a CMOS-type camera or a CCD-type camera may be implemented to generate various image signals. As will be further described below, the various image signals may be analyzed to determine the various dynamic conditions of the vehicle.

ISS 56 may also be coupled to an input device such as HMI 59. The HMI 59 may include a keyboard or other push button type device. The HMI 59 may be used to enter trailer parameters or indicate to the controller a selection or other inputs.

A reverse aid system 46 having at least one reverse aid sensor 48 may be coupled to ISS 26. Reverse aid sensor 48 may be but is not limited to an ultrasonic sensor, a radar sensor, or a combination of the two. Reverse aid sensors 48 are typically located at several locations of the rear of the vehicle such as in the bumper. As described above, the reverse aid system 46 may be used to provide an indication as to the presence of a trailer and may also be used to generate a particular pattern with respect to the trailer to allow the controller to have feedback with respect to the position of the trailer. The reverse aid system 46 may alternatively or additionally include cameras 49. The sensors 48 and/or cameras 49 can be used to detect trailer presence and oscillation by, for example, the edge detection scheme previously discussed.

A hand wheel (also known as "steering wheel", which may also be a steer by wire or electronic steering assist system) position sensor 90 may also be coupled to ISS 56. Hand wheel position sensor 90 provides controller 26 with a signal corresponding to the relative rotational position of the steering wheel within the vehicle. Various types of sensors include absolute sensors and position sensors using a center find algorithm (relative sensors). Relative sensors may use the centerfind algorithm to determine the position relative to a center position once the position is known. Both types of sensors may provide a steering angle rate signal and/or a steering direction signal. For example, the steering direction may indicate away from or toward a center position or end stop position.

A hand wheel torque sensor 92 may also be coupled to ISS 56 and provide data to the controller 26. Hand wheel torque sensor 92 may be a sensor located within the steering column for direct measurement. The steering torque may also be inferred from data available to the power steering system. The hand wheel torque sensor 92 generates a signal corresponding to the amount of torque placed on the hand wheel (steering wheel) within the vehicle. This steering torque signal is input into the neural network.

A mu (μ) sensor 94 may also be coupled to controller 26 by way of the ISS 56. Mu sensor 94 may be a direct sensor or, more likely, is a calculated value based on available inputs. Various systems such as a yaw control system for an anti-lock brake system may generate mu. Mu is an indication of the coefficient of friction of the surface on which the vehicle is traveling. The mu sensor 94 may be used to generate a coefficient of friction for the vehicle or the coefficient of friction at more than one contact patch of the tire. Preferably, a mu is determined at each contact patch of each tire.

A throttle sensor 96 may also be coupled to controller 26 by way of the ISS 56. Throttle sensor 96 may, for example, be a resistive sensor. Of course, other types of throttle sensors would be evident to those skilled in the art. Throttle sensor 96 generates a signal corresponding to the position of the throttle of the vehicle. The throttle sensor 96 may give an indication as to the driver's intention regarding acceleration. Throttle sensor may also be part of a drive-by-wire type system. A throttle type sensor may also be used in electric vehicles and vehicles with diesel engines to determine the desire acceleration. These sensors may take the form of a pedal sensor. Typically this information is available from the vehicle bus. The neural network is collecting data from the vehicle bus and using it accordingly. This is yet another example of how the present invention utilizes sensor information that is already available on the vehicle.

A vehicle load sensor 98 to sense the amount of weight or payload within the vehicle may also be coupled to controller 26 through the ISS 56. Vehicle load sensor 98 may be one of various types of sensors including a suspension sensor. For example, one load sensor may be located at each suspension component. Load sensor 98 may, for example, be a pressure sensor in an air suspension. The load sensor 98 may also be a load cell. In any case, the vehicle load sensor 58 generates an electrical signal corresponding to the load on the vehicle. One sensor or preferably one sensor for each corner of the vehicle may be used. The vehicle load may, for example, be the normal load at each corner of the vehicle. By knowing the normal load at each corner of the vehicle, the total amount of loading on the vehicle may be determined.

A suspension height sensor 97 may also be coupled to ISS 56. Suspension height sensor 97 may be a suspension height sensor located at each corner of the vehicle. Suspension height sensor 97 may also be part of an air suspension or other type of active suspension. Suspension height sensor 97 generates a height signal corresponding to the extension of the suspension. The suspension height sensor 97 may also be used to determine the vehicle load, normal load, and payload distribution, rather than using vehicle load sensor 98 described above. Suspension height sensor 97 may be one of various types of sensors including a laser, optical sensor, or the like.

A transmission gear selector 99 may also be coupled to ISS 56. Transmission gear selector 99 may, for example, comprise a shift lever that has the PRNDL selections corresponding to the park, reverse, neutral, regular drive and low drive positions of the transmission. Also, an electrical signal may be generated in response to the position of the shift lever of a manual transmission.

A mode selector 100 may also be coupled to ISS 56. Mode selector 100 may select a driver selectable mode selector such as a manually activated mechanism (e.g., push button or the like) or a voice recognition system. Mode selector 100 may, for example, select a position that corresponds to trailering. Also, mode selector may determine a park position indicating that the vehicle operator intends to park the vehicle. A U-turn position may also be selected. The mode selector may be used to enable or disable the system.

A display 44 may also be coupled to controller 26. Display 44 displays various types of displays or combinations of displays. Display 44 may display the various conditions of the vehicle such as trailering, or trailer sway control. Display 44 may warn of various conditions such as an impending rollover, understeer, oversteer, an approach of an in-path object, or impending trailer interference during a reverse direction. The warnings are provided in time for the driver to take corrective or evasive action. Display 44 may also be an audible display such as a warning buzzer, chime or bell. The display may also activate a haptic warning such as a vibrating steering wheel. Of course, a combination of audible, visual, and haptic display may be implemented. Display 44 may be a light on a dash panel or part of a more complex LED or LCD display on the instrument panel of the vehicle. It could also be a heads-up display. Of course, other locations for the display may include an overhead display or the like. Display 44 may also be used to display the projected position of a trailer relative to the vehicle.

Based upon inputs from the sensors and/or cameras, GPS, and lidar or radar, controller 26 may control a safety device 102. Depending on the desired sensitivity of the system and various other factors, not all the sensors, cameras, lidar or radar, or GPS may be used in a commercial embodiment. Safety device 102 is part of a vehicle subsystem control and is used, in this example, to mitigate trailer oscillation. Thus, safety device 102 may modify the individual wheel torque or braking, activate suspension components, or modify the steering angle to improve trailering performance.

Safety device 102 may control a steering actuator 104, or a braking actuator 106 at one or more of the wheels. Engine intervention 108 may act to reduce engine power to provide improved trailering by inhibiting oscillation. Also, other vehicle components such as a suspension control 110 may be used to adjust the suspension and provide for various types of control in dynamic conditions such as during trailer sway. The systems 104-110 may act alone or in various combinations.

Steering actuator 104 may include the position of the front right wheel actuator, the front left wheel actuator, the rear left wheel actuator, and the right rear wheel actuator. Two or more of the actuators may be simultaneously controlled. For example, in a rack-and-pinion system, the two wheels coupled thereto are simultaneously controlled.

Safety device 102 may also comprise a roll stability control system 112, a yaw stability control system 116, a traction control system 114, and/or an anti-lock brake system 118. The roll stability control system 112, anti-lock brake system 118, yaw stability control system 116, and traction control system 114 may be coupled to brake actuator 106. Further, these systems may also be coupled to steering actuator 104. Engine intervention 108 may also be coupled to one or more of the devices, particularly the roll stability control system, yaw stability control system, and traction control system. Thus, the steering actuator 104, brake system 106, engine intervention 108, and suspension control 110 may be part of one of the dynamic control systems 112-118.

A level-based system 120 may also be coupled to controller 26. Level-based system 120 uses the pitch level or angle of the vehicle to adjust the system. Level-based system 120 may, for example, be a headlight adjustment system or a suspension leveling system. Headlight adjustment system adjusts the beam pattern downward for a loaded vehicle. Suspension leveling system adjusts the suspension at the various corners of the vehicle to maintain the vehicle relatively level to the road. The level-based system 120 may also make an adjustment based on the roll angle of the vehicle.

Referring again to FIG. 1, the trailer 15 is towed behind vehicle 14. Trailer 15 may include a tongue 41 and trailer wheels 30a and 30b. Of course, various numbers of axles/wheels may be used on a trailer having a right and left wheel or set of wheels. Each trailer wheel 30a, 30b includes a trailer brake 17a, 17b. Trailer 15 may also include other electrical components such as lights. A harness 42 may be used to couple the electrical components such as the brakes 17a, 17b and lights to the vehicle 10. More precisely, the harness 42 may be used to couple the trailer to the electrical system of the vehicle. Harness 42 may also couple the trailer 15 to a trailer brake controller 31. Trailer brake controller 31 may be an independent controller or may be integrated within brake controller 106 described above. Preferably, trailer brake controller 31 is capable of controlling brakes 17*a*, 17*b* together or independently.

Referring now to FIG. 4A, the trailer 15 is shown coupled to the vehicle 14 through a hitch 122 located at the end of tongue 41. The hitch 122 may have a hitch sensor 124 thereon. The hitch sensor 124 is used to determine the position of the trailer 15 relative to the vehicle 14. Various types of hitch sensors such as resistive, inductive, ultrasonic or capacitive type sensors may be used to determine the relative angle of the trailer 15 with respect to the vehicle. Hitch sensor 124 may be used to determine the vehicle load. Other ways to determine the position of the trailer may include cameras 49 located on either the trailer or vehicle, or the reverse sensors 48.

An alternative method for determining the relative position of the trailer 15 relative to the vehicle is also illustrated in FIG. 4A-4C. The vehicle is illustrated having a ball 125 that is positioned at or near the rear bumper 126 of the vehicle. In this embodiment, only two reverse aid sensors 48 are illustrated. However, various numbers of reverse aid sensors may be illustrated. Trailer tongue 41 has a locating plate 127 thereon. Locating plate may, for example, have a locating hole 128 aligned with the center of the tongue 41. In addition to or instead of locating hole 128, a locating opening 129 may be positioned on the locating plate. The locating plate 127 is fixedly attached to the trailer or tongue 41 so that the locating hole 128 and/or the locating opening 129 is centered with the tongue. The reverse sensing system detects the position of either the locating hole 128 or locating opening 129. Thus, the relative position of the trailer may be determined using the reverse aid sensors 48. The reverse aid sensors 48 generate signals and locate the position of the locating hole. The display 44 described above in FIG. 3 may generate a screen display or audible display based on the position of the locating plate and thus the tongue 41 relative to the vehicle. Thus, while backing the vehicle 14 to attached the trailer thereto, the ball 125 may be more easily aligned with the trailer hitch 122. To summarize, a method for aligning a vehicle includes driving the vehicle in a reverse direction and sensing the position of a locating plate or a locating guide such as the hole 128 or opening 129. An indicator may be generated in the vehicle corresponding to the position of the trailer hitch or tongue relative to the vehicle. The vehicle could be automatically brake-steered or braked to cause alignment of the ball on the vehicle to the hitch on the trailer.

Yet another method of determining the alignment of the trailer with respect to the vehicle is as follows. The ball hitch 125 has a shallow square hole H1 at its top into which fits a mating spring-loaded rod and corresponding spring S1 on the trailer coupler 122. (The spring-loading prevents damage to the rod and hole if the hitch is coupled with the rod and hole out of alignment.) The rod is connected to a potentiometer P1 or optical rotation sensor affixed to the trailer coupler 122. When the vehicle turns relative to the trailer, the potentiometer or optical rotation sensor is rotated, providing a measurement of the relative vehicle-trailer angle.

Another simple method of determining trailer angle relative to the vehicle is to use a retractable cable attached between the vehicle and trailer. Preferably, the cable connection would be as far from the hitch connection as possible to magnify the relationship. The cable would include a mechanism for measuring the length of the cable extending between the trailer and vehicle.

Figure 5:
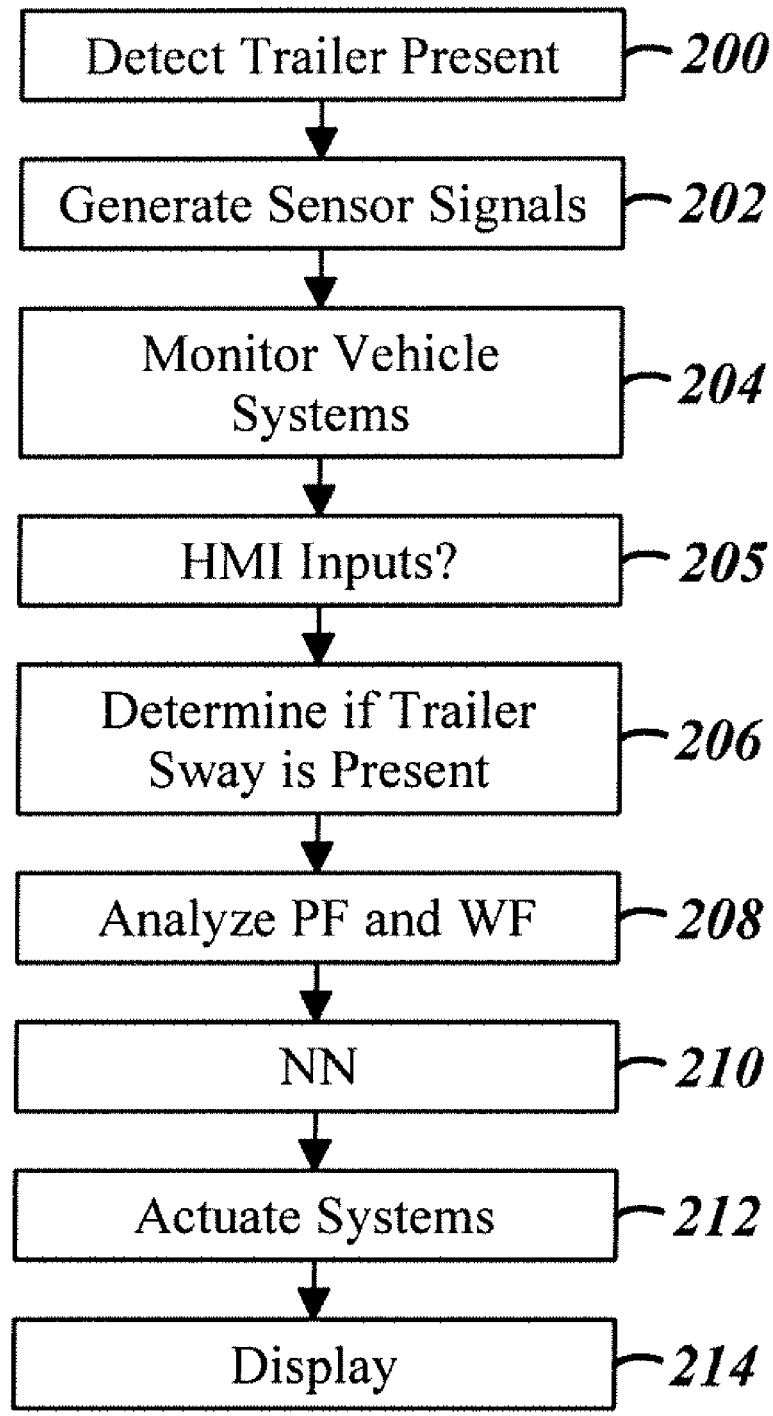
FIG. 5 is a logic flow diagram illustrating a method of operating an embodiment of the present invention.

FIG. 5 is logic flow diagram illustrating a method of operating a control system or a stability control system of a vehicle that is pulling a trailer in accordance with an embodiment of the present invention. Although the following steps are described primarily with respect to the embodiments of FIGS. 1-3, they may be modified and applied to other embodiments of the present invention. The method is used to enhance the trailerability of a vehicle.

In step 200, it is determined if the vehicle is trailering. The presence of a trailer may be determined in several manners, including, for example, the hitch sensor, the reverse aid system, an ultrasonic sensor (which may be one of the reverse aid system sensors or cameras), monitoring a current through a harness, a push button, a camera, or algorithm-based loading or loading detection through existing vehicle dynamics sensors. The operator may also input, via the HMI 59, that a trailer is connected. The algorithm-based vehicle loading and loading location determination uses the vehicle dynamics control sensor sets. If the system determines a large loading and loading location significantly beyond the rear axle, the vehicle has a trailer.

In another example, if the vehicle is so equipped, the trailer brake controller 31, may determine if a trailer is connected. For example, the TBC 31 may apply current to magnets located within the electric trailer brakes. In response to the field generated by the magnets the trailer brake controller detects that a trailer is present and connected to the vehicle. Another method to determine whether the trailer is connected and to perform control is to detect sway oscillations in a certain frequency range, such as between 0.5-1.5 Hz, which occur for a specific period of time and that are not caused by steering changes. The frequencies with the specified inputs are equivalent to trailer sway, hence a trailer is connected.

Upon detection of a trailer the control system proceeds to step 202. In step 202, various sensor signals are generated from sensors, such as those described herein. In step 204, the vehicle systems are monitored and/or adjusted. For example, if it is determined that the vehicle is operating in a reverse direction, no further action may be taken, as the present method is intended to mitigate trailer oscillations when the vehicle is traveling forward. Also, if the vehicle is not moving, or if the operator is applying the brakes, the logic may enter a holding state or reset. As part of the sensor data collection, the steering wheel angle may also be considered to predict the vehicle path. The predicted vehicle path may influence any corrective action taken in response to detected trailer oscillation. The predicted vehicle positions may be determined as a function of the current steering wheel angle and the current angle between the trailer and vehicle.

In step 205, the trailer data is analyzed, as input from the operator through the HMI 59. Such information as trailer weight, length, height, type (open or closed), number of axles, hitch-to-axle distance, etc. could be considered. If no HMI inputs are available, the system will consider a default set of trailer parameters. The learning aspect of the neural network will then adjust accordingly. In this way, the present method is very robust as compared to rules-based systems. The HMI input data likely will reduce the learning curve of the system during performance optimization, but is not necessary to achieve optimal trailering performance. The present invention contemplates the use of a calibration routine additionally or alternatively to the HMI input process. For instance, the operator may be instructed to travel a certain speed while turning in a tight radius to the left and/or right after trailer hookup. From such a routine, the maximum angular relationship between the trailer and vehicle could be set, as well as the load the trailer imposes on the vehicle, among other things.

In step 206, one or more oscillation signals are generated from the sensor data by the oscillation detector 52. Yaw rate and lateral acceleration sensors may be considered sway detection sensors, in that the yaw rate signals and the lateral acceleration signals may be used to determine whether a vehicle and/or trailer are experiencing oscillation. The oscillation signals may be indicative of the trailer swaying relative to the vehicle. In addition to the stated signals, vehicle speed signals and longitudinal acceleration signals are generated, which are indicative of the speed and longitudinal state of the vehicle. Although the stated sensors and signals are located and respectively generated on the vehicle, similar sensors (IMU) and signals may also be located and generated on or associated with the trailer. The vehicle speed signals may be generated via wheel speed sensors, engine speed sensors, drivetrain speed sensors, or the like, or via some other known vehicle speed generation method, like GPS.

Trailer oscillation may also be detected by spectral analysis of the ultrasonic sensor data as described above. This sensor data can be calibrated during periods of forward acceleration as described above. If cameras 49 are used, an edge detection scheme may also indicate the relative angle of the trailer with respect to the vehicle. Similarly, if the vehicle is equipped, a trailer hitch sensor such as shown in FIG. 4C or face plate scheme such as describe with respect to FIG. 4B may be used to determine the trailer angle relative to the vehicle. A retractable cable may also be used to determine the trailer-vehicle angle.

In step 208, the penalty function 63 for the neural network is analyzed and communicated to the trainer 54. Initially, the penalty function will be a default weighting, based on the default trailer parameters and sensor data. The trainer supplies initial weight factors to the data vector of the neural network. During subsequent system activations to mitigate detected trailer oscillations, if the penalty function is reduced in response to such changes, the trainer will retain system response. If the penalty function increases in response to system activities in an attempt to mitigate trailer oscillation, the trainer will modify the weight function for that associated system activity.

In step 210, the weight factors for the various vehicle systems are communicated to the neural network 50. The neural network outputs a data vector, according to the weighted functions, for the various vehicle systems. Initially, the data vector will be a default set of actions for the vehicle systems to perform in response to a detected trailer oscillation. Iteratively, the neural network, because of the penalty function of the trainer, will improve the system performance and response.

In step 212, the various vehicle systems are activated by the neural network-based controller according to the weight factors, as modified by the trainer. Activities may include modifying the individual wheel torque, active suspension components, the steering angle of the wheels, or the braking at any of the wheels. As discussed with regard to FIG. 3, the systems may be acted upon by way of the steering, braking, engine, suspension, or safety systems. Vehicle actions in response to detected trailer oscillation may be indicated to the vehicle operator by way of the display in step 214. The logic then repeats by monitoring, in step 202, the vehicle and/or trailer response by way of the sensors associated with the ISS 56. The trailer sway in step 206 is then compared to determine whether the actions taken in step 212 improved the trailer oscillation.

For example, if the suspension is adjusted in response to a detected trailer oscillation, and the oscillation increases in magnitude, the penalty function will increase. As a result, the weight factors for adjusting the suspension will be reduced, or returned to its prior state. Conversely, if a suspension adjustment decreases trailer oscillation, the penalty function for this factor will also decrease or at least stay the same. Thus, the weight factor will increase or stay the same. In other words, the activity will be retained. This results in optimizing the control strategy automatically for a particular vehicle and trailer combination, through successive incremental change over time. As the strategy becomes more robust for a particular vehicle and trailer combination, the vehicle can increase its speed while at least maintaining or, preferably, mitigating the magnitude of trailer oscillation.

In another example of operating the present method, a turning and trailering condition is determined. The brake-steer is activated upon the detection of a potentially unstable trailering condition. The yaw stability control tuned for normal vehicle driving is based on the driver's intention to control the over-steer or under-steer of the vehicle such that the vehicle is maintained on the driver's intended course. Since yaw error feedback and side slip feedback are used in yaw stability control, they can cause problems during turning and unstable trailering. In one aspect, the divergent trailer lateral motion would cause a fluctuation of the vehicle yaw rate and side slip angle. From the yaw stability control point of view, the vehicle crosses the over-steer and under-steer boundary from time to time. Hence under-steer correction (steering the car more) and over-steer control (steering less) will activate. If those activations are not carefully done, the trailer's dynamic lateral deviation may be excited rather than controlled.

Therefore it is desirable to provide a control system to enhance the traditional yaw stability control upon the detection of the unstable trailering during a turning. The system uses the braking to steer the vehicle in an opposite direction of the trailer motion so as to stabilize the trailering. Such a system includes determining a presence of a trailer, determining a vehicle velocity, determining the steering wheel angle, determining a sensor yaw rate from the yaw rate sensor, calculating a desired yaw rate based upon the hand wheel angle position signal (which reflects the driver's intention), determining a rear axle side slip angle, and controlling the brakes of the vehicle such that the trailering stability is improved.

More specifically, upon the detection of trailering while the vehicle is turning, when the rear axle side slip angle is determined to be above a predetermined rear axle slip with rate change of the side slip angle above certain threshold, and the vehicle velocity is above a vehicle velocity threshold, one or more brake control commands (amount of the brake pressures) are generated based on the magnitude of the calculated rear side slip angle and the magnitude of its rate change, the yaw angular rate, and the desired yaw angular rate. The commands are generated by the neural network in response to feedback provided by the trainer and oscillation detector. Depending upon the rear side slip angle data, the weighting of the brake pressure for the vehicle or trailer brakes is modified. The penalty function will thus look to determine whether the action reduced the magnitude of the rear side slip angle. That is, when there is a positive rear side slip angle, the braking is applied to a wheel such that the vehicle intends to generate negative side slip angle upon the application of braking; when there is a negative rear side slip angle, the braking is applied to a wheel such that the vehicle intends to generate positive rear side slip angle upon the application of braking.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a vehicle that is pulling a trailer, wherein the tow point of the trailer is rearward of all vehicle axles, the method comprising:
determining an angular position of the trailer relative to the vehicle using a trailer sensor during forward motion of the vehicle;
generating an oscillation signal indicative of trailer swaying relative to the vehicle, said oscillation signal being generated by a controller having an oscillation detector as a function of the angular position;
generating an initial weighted dynamic control signal in a controller having a neural network;
supplying the weighted dynamic control signal output from the neural network to a vehicle dynamic control system in response to the oscillation signal;
operating at least one vehicle dynamic system according to the weighted dynamic control signal;
during subsequent neural network outputs to the vehicle dynamic control signal, iteratively generating a penalty function in the oscillation detector to be applied to the weighted dynamic control signal as a function of the oscillation signal;
for a weighted dynamic control signal which mitigates trailer sway, reducing the penalty function in the oscillation detector and maintaining the weighted dynamic control signal supplied by the neural network to the vehicle dynamic control system; and
for a weighted dynamic control signal which does not mitigate trailer sway, increasing the penalty function in the oscillation detector and modifying the weighted dynamic control signal supplied by the neural network to the vehicle dynamic control system.

2. A method as recited in claim 1 wherein the dynamic control system comprises at least one of a vehicle brake controller, wheel torque controller, engine torque controller, or suspension controller.

3. A method as recited in claim 1 comprising receiving trailer data, and wherein generating an initial weighted dynamic control signal is in response to the trailer data.

4. A method as in claim 3 wherein the trailer data comprises at least one signal indicative of trailer weight, length, height, type, number of axles, and hitch-to-axle distance.

5. A method as recited in claim 1 wherein the trailer sensor comprises a hitch sensor, a reverse aid sensor, a camera, or a locating plate coupled to a trailer tongue.

6. A method as recited in claim 2 comprising actively braking at least one trailer brake or at least one vehicle brake upon generating an oscillation signal indicative of trailer swaying relative to the vehicle.

7. A method of controlling a vehicle that is pulling a trailer wherein the tow point of the trailer is rearward of all vehicle axles, the method comprising:
determining an angular position of the trailer relative to the vehicle using a trailer sensor during forward motion of the vehicle;
generating an oscillation signal indicative of the trailer swaying relative to the vehicle, said oscillation signal being generated in a controller having an oscillation detector as a function of the angular position;
generating an initial weight weighted dynamic control signal in a controller having a neural network and an associated trainer;
supplying the weighted dynamic control signal to a vehicle dynamic control system in response to the oscillation signal;
referencing an identifier for the trailer in the neural network and the associated trainer;
operating at least one vehicle dynamic system according to the weighted dynamic control signal;
during subsequent neural network outputs to the vehicle dynamic control signal, iteratively generating a penalty function in the oscillation detector and applying the penalty function to the weighted dynamic control signal;
for a weighted dynamic control signal that mitigates trailer sway, reducing the penalty function in the oscillation detector and maintaining the weighted dynamic control signal output by the neural network for the at least one vehicle dynamic system;
for a signal which does not mitigate trailer sway, increasing the penalty function in the oscillation detector and altering the weighted dynamic control signal output by the neural network for the at least one vehicle dynamic system;
associating results of the weighted dynamic control signal supplied by the neural network with the penalty function supplied by the oscillation detector using the associated trainer, the results also being associated with the identified trailer; and
storing the results for recall by the neural network, wherein, the neural network recalls results from the associated trainer for the identified trailer upon referencing the identifier for the trailer.

8. The method as recited in claim 7 wherein the dynamic control system comprises at least one of a vehicle brake controller, wheel torque controller, engine torque controller, or suspension controller.

9. A method as recited in claim 7 comprising receiving trailer data, and wherein generating an initial weighted dynamic control signal is in response to the trailer data.

10. A method as in claim 9 wherein the trailer data comprises at least one signal indicative of trailer weight, length, height, type, number of axles, and hitch-to-axle distance.

11. A method as recited in claim 7 wherein the trailer sensor comprises a hitch sensor, a reverse aid sensor, a camera, or a locating plate coupled to a trailer tongue.

12. A method as recited in claim 8 comprising actively braking at least one trailer brake or at least one vehicle brake upon generating an oscillation signal indicative of trailer swaying relative to the vehicle.

* * * * *